(12) United States Patent
Kruglick

(10) Patent No.: US 9,760,912 B2
(45) Date of Patent: Sep. 12, 2017

(54) DEVICE TELEMETRY FOR USER EXPERIENCE PREDICTIONS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 533 days.

(21) Appl. No.: 14/311,807

(22) Filed: Jun. 23, 2014

(65) Prior Publication Data

US 2015/0369705 A1 Dec. 24, 2015

(51) Int. Cl.
*G06Q 10/10* (2012.01)
*G06Q 30/02* (2012.01)
*G06Q 50/00* (2012.01)

(52) U.S. Cl.
CPC ......... *G06Q 30/0282* (2013.01); *G06Q 10/10* (2013.01); *G06Q 50/01* (2013.01)

(58) Field of Classification Search
CPC ..................................... G06Q 10/10
USPC ....................................... 702/188
See application file for complete search history.

(56) References Cited

U.S. PATENT DOCUMENTS

| 8,572,107 | B2 | 10/2013 | Fan et al. | |
| 9,489,039 | B2 * | 11/2016 | Donovan | G06F 3/011 |
| 2013/0285836 | A1 | 10/2013 | Proud | |

FOREIGN PATENT DOCUMENTS

WO 2013051009 A2 4/2013

OTHER PUBLICATIONS

"A demo of K-Means clustering on the handwritten digits data," Accessed at http://web.archive.org/web/20131106002108/http://scikit-learn.org/stable/auto_examples/cluster/plot_kmeans_digits.html, Accessed on Jun. 12, 2014 pp. 4.
"Brocade and IBM Real-Time Network Security Intelligence Gathering and Analysis Solution," Accessed at http://www.brocade.com/downloads/documents/at_a_glance/infosphere-streams-mlxe-secuirty-ag.pdf, Accessed on Jun. 12, 2014 pp. 2.
"Clustering," Accessed at http://web.archive.org/web/20140326094552/http://scikit-learn.org/stable/modules/clustering.html, Accessed on Jun. 12, 2014 pp. 18.
"Decomposing signals in components (matrix factorization problems)," Accessed at http://web.archive.org/web/20140326095708/http://scikit-learn.org/stable/modules/decomposition.html, Accessed on Jun. 12, 2014 pp. 12.
"IBM Introduces Predictive Analytics Software and Services that Forecast Asset Failure," published on Mar. 21, 2013, Accessed at http://web.archive.org/web/20140209072252/http://www-03.ibm.com/press/us/en/pressrelease/40575.wss, Accessed on Jun. 12, 2014 pp. 3.

(Continued)

*Primary Examiner* — Bryan Bui
(74) *Attorney, Agent, or Firm* — Brundidge & Stanger, P.C.

(57) ABSTRACT

In some examples, one or more processors of a computing system may receive telemetry data from a plurality of devices, user identifications (IDs) of a set of users of the plurality of the devices, and information from social media indicative of user sentiments toward the devices. The computing system may predict user experience related to the devices based at least in part on the telemetry data, the user IDs, and the information from the social media.

24 Claims, 6 Drawing Sheets

(56) References Cited

OTHER PUBLICATIONS

"Knowledge Base," Accessed at http://web.archive.org/web/20140327212914/http://en.wikipedia.org/wiki/Knowledge_base, Accessed on Jun. 12, 2014, pp. 6.

"More Than 30 Billion Devices Will Wirelessly Connect to the Internet of Everything in 2020," published on May 9, 2013, Accessed at https://www.abiresearch.com/press/more-than-30-billion-devices-will-wirelessly-conne, Accessed on Jun. 12, 2014, p. 1.

"scikit-learn: Machine Learning in Python," Accessed at http://web.archive.org/web/20140528112336/http://scikit-learn.org/stable/, Accessed on Jun. 12, 2014 pp. 2.

"Singular Value Decomposition," Accessed at http://web.archive.org/web/20140419024340/http://en.wikipedia.org/wiki/Singular_value_decomposition, Accessed on Jun. 12, 2014 pp. 15.

"sklearn.preprocessing.LabelEncoder," Accessed at http://web.archive.org/web/20140326101154/http://scikit-learn.org/stable/modules/generated/sklearn.preprocessing.LabelEncoder.html, Accessed on Jun. 12, 2014 pp. 3.

"sklearn.preprocessing.scale," Accessed at http://web.archive.org/web/20140326093937/http://scikit-learn.org/stable/modules/generated/sklearn.preprocessing.scale.html, Accessed on Jun. 12, 2014 pp. 2.

"Social Networking Statistics," Accessed at http://web.archive.org/web/20140513070125/http://www.statisticbrain.com/social-networking-statistics/, Accessed on Jun. 12, 2014 pp. 3.

Biggs, J., "Amazon Introduces Mayday, A Unique and Amazingly Useful Live Tech Support System for Kindle," posted on Sep. 24, 2013, Accessed at http://web.archive.org/web/20140605200536/http://techcrunch.com/2013/09/24/amazon-introduces-mayday-a-unique-and-amazingly-useful-live-tech-support-system-for-kindle/, Accessed on Jun. 12, 2014 pp. 3.

Bult, K. et al., "Low Power Systems for Wireless Microsensors," International Symposium on Low Power Electronics and Design, pp. 17-21 (1996).

Chung, D., "Customer Service in the Age of the Internet of Things," published on Aug. 16, 2013, Accessed at http://web.archive.org/web/20140216095615/http://blogs.hbr.org/2013/08/customer-service-in-the-age-of/, Accessed on Jun. 12, 2014, pp. 2.

Chunyang, M. et al., "KSQ: Top-$(k)$ Similarity Query on Uncertain Trajectories," IEEE Transactions on Knowledge and Data Engineering, vol. 25, No. 9, Sep. 2013, pp. 2049-2062.

Dileo, M. et al., "Condition Based Maintenance," Accessed at http://www.cadickcorp.com/download/cbm_tech8.pdf, pp. 1-18 (1999).

Yang, M., "Early Fault Detection Scheme and Optimized CBM Strategy for Gear Transmission System Operating under Varying Loads," T-Space at the University of Toronto Libraries, pp. 1-102 (2011).

"ETE 2012—Nathan Marz on Storm," accessed at http://web.archive.org/web/20131230115552/http://www.youtube.com/watch?v=bdps8tE0gYo, published on May 15, 2012, pp. 2.

"Streamed Clustering of Lightning Mapping Data in Python Using sklearn; SciPy 2013 Presentation," accessed at http://www.youtube.com/watch?v=0Z17Q22HEMI, published on Jul. 1, 2013, pp. 2.

\* cited by examiner

DEVICE TELEMETRY FOR USER EXPERIENCE PREDICTIONS

TECHNICAL FIELD

The embodiments described herein pertain generally to stream monitoring and, more particularly, to prediction of user experience using streams of network-connected device telemetry and social media sentiment mining.

BACKGROUND

Unless otherwise indicated herein, the approaches described in this section are not prior art to the claims in this application and are not admitted to be prior art by inclusion in this section.

It is expected that in the near future billions of network-connected appliances and consumer items will be employed in households, offices and various other locations. The so-called "Internet of Things" (IoT) is expected to involve connecting almost any conceivable electronic device to the Internet, through one or more channels. For example, a typical appliance may engage in power-plug enabled smart power discussions with a home power management unit and remit data to the power company while the same appliance may also have a ZigBee or Wi-Fi interface that delivers data and controls to a home automation system.

Meanwhile, customer service is still highly reactive, even on Internet browser-enabled appliances. Typically, users are sent to online knowledge bases and forums to seek answers to problems, or to general-purpose technical support staff. This approach tends to require the problem to become bad enough for the user to notice it and find it worth their time to search for help. In contrast, smart devices may probably have built-in help functions. For instance, if a lawnmower has been used for two hours and it overheats, the user screen on the lawnmower's handle or steering wheel may automatically indicate the problem with a searchable list of common resolutions for that model.

SUMMARY

In one example embodiment, a method may include one or more processors receiving telemetry data from a plurality of devices, user identifications (IDs) of a first set of users of the plurality of the devices, and information from social media indicative of user sentiments toward the devices. The method may also include the one or more processors predicting user experience related to the devices based at least in part on the telemetry data, the user IDs, and the information from the social media.

In another example embodiment, a computer-readable storage medium having stored thereon computer-executable instructions executable by one or more processors to perform operations that include: preprocessing one or more streams of telemetry data from a plurality of devices to provide preprocessed telemetry data by scaling the received telemetry data; receiving information from social media indicative of user sentiments toward the devices; and predicting a user experience related to the devices based at least in part on the telemetry data, user IDs of users of the devices, and the information from the social media.

In yet another example embodiment, an apparatus may include a telemetry and sentiment monitoring module. The telemetry and sentiment monitoring module may include a preprocessing unit, a saliency filtering unit, a telemetry identification matching unit, and a clustering unit. The preprocessing unit may be configured to preprocess one or more streams of telemetry data from a plurality of devices to provide preprocessed telemetry data by scaling the received telemetry data. The saliency filtering unit may be configured to perform dimensionality reduction in the preprocessed telemetry data. The telemetry identification matching unit may be configured to perform operations including: matching at least a portion of the user sentiments to one or more of user IDs of a first set of users of the plurality of the devices, correlating the matched one or more of the user IDs to one or more of the devices associated with at least one of the one or more streams of telemetry data, and receiving information from social media indicative of user sentiments toward the devices. The clustering unit may be configured to cluster a second set of users of the devices into a plurality of clusters of users each of which associated with a respective user sentiment toward the devices, the second set greater than the first set.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
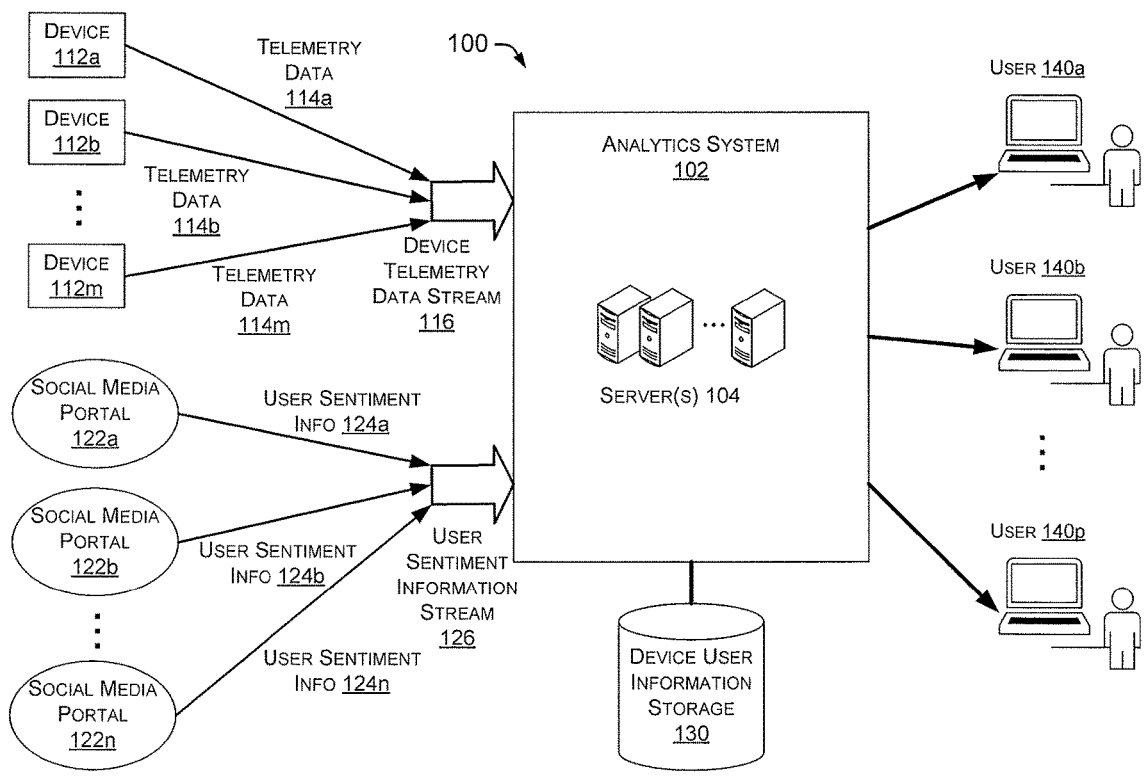
FIG. 1 shows an example scheme in which analytics may be implemented, arranged in accordance with at least some of the embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Network-connected devices may be configured to sense and report their condition and usage status to provide vast amounts of data, e.g., device telemetry, to one or more data collectors such as, for example, makers of the devices and/or service providers. In the age of connected appliances consumers may expect faster customer support and proactive problem solving, and there may be many options for product development. For instance, by data mining user sentiments towards products, e.g., network-connected appliances and devices, and matching such information to device telemetry data, user experience may be predicted and pre-emptive and/or corrective actions may be taken.

The present disclosure describes an analytics system that integrates and co-clusters streams of network-connected device telemetry data with social media sentiment mining to identify clusters of users with use cases of specific devices and to predict their probable level of satisfaction, e.g., user experience. The analytics system may match social media sentiment data to a small sampling of device owners through user registration information, and utilize that sentiment data for dimensionality reduction and clustering of the telemetry data. Accordingly, the analytics system may preserve telemetry data relevant to satisfaction and generate user cluster data that indicates user experience, e.g., user satisfaction levels, for marketing and customer service.

Existing best-in-class enhanced customer service systems typically link technical support directly with a given user's device when the user calls for help. However, such systems do not identify clusters of users who do not call in, predict sentiment, or enable companies to take pre-emptive and/or corrective actions, e.g., send out emails to users to intervene and prevent bad user experiences. In contrast, advantages provided by the analytics system of the present disclosure would result in valuable marketing links to happy customers suitable for cross-selling, pre-emptive customer service capability, and information on use cases and performance suitable for strategic design of future generations of products.

Presently there are analytics for "condition based maintenance as a service". For example, an existing approach applies analytics to a variety of sensors and manufacturing inputs to sense when equipment needs repairs or when manufacturing lines are likely to be manufacturing poor-quality products. The problem with such approach for scaling or mass consumer products is that such approach presumes a closed cycle where the user/owner of the asset is also the one owning the analysis process and therefore actively collecting data (e.g., it applies within a factory or for a municipality that has its own repair crew filling out paperwork on breakdowns so that the analytics system can be trained). This approach, however, would not be amenable to consumer products after the consumer products are sold because most consumers do not report their ongoing product experience to the manufacturers.

The proposed scheme of the present disclosure targets field condition analysis without the aforementioned restriction. The concept of the present disclosure is to receive device telemetry and user identifications (IDs), match at least some user IDs to social media for user sentiment, and co-train clustering based on both user sentiment and device telemetry. The setup stage results in an automatic (and continuously improving) clustering process that automatically predicts user experience (e.g., happiness, satisfaction, dissatisfaction, etc.) and experience traits even for users who are not calling support or talking online about any user-owned product. The telemetry based predictions may be linked to pre-emptive and/or corrective actions such as, for example, sending offers for add-on products to happy customers and gentle corrections, suggestions, or software updates to customers who are likely not happy about device performance (potentially before the customer even has time to get unhappy).

FIG. 1 shows an example scheme 100 in which analytics may be implemented, arranged in accordance with at least some of the embodiments described herein. As depicted, example scheme 100 includes, at least, analytics system 102, a set of network-connected devices 112a-112m, and a set of social media portals 122a-122n.

Analytics system 102 may include one or more servers 104.

Each of servers 104 may be operated by one or more processors and may be configured to perform operations related to device telemetry for user experience predictions in accordance with various embodiments described herein.

As shown in FIG. 1, analytics system 102 may receive device telemetry data stream 116 and user sentiment information stream 126 based on which one or more servers 104 may monitor telemetry and sentiment to thereby predict user experience in accordance with the present disclosure.

Example scheme 100 optionally includes device user information storage 130 and one or more users 140a-140p. Device user information storage 130 may store user information associated with users of devices such as network-connected devices 112a-112m. The user information stored in device user information storage 130 may include, for example, user profiles of each user, e.g., user name, user identification (ID), contact information (e.g., address, phone number(s), email address(es)); and information related to one or more devices purchased by the user (e.g., product description, brand, type, model, etc.). In some embodiments, results of telemetry and sentiment monitoring and/or prediction of user experience may be provided by analytics system 102 to one or more users 140a-140p, e.g., displayed on a computing device used by each of one or more users 140a-140p.

Network-connected devices 112a-112m may include a set of appliances, equipment and/or devices configured to collect, record and provide telemetry data 114a-114m retrievable or otherwise receivable by analytics system 102 over one or more wired and/or wireless networks (not shown) by any suitable communication protocols and technologies. For example, one or more of network-connected devices 112a-112m may be configured to transmit the respective telemetry data. As another example, one or more other ones of network-connected devices 112a-112m may not be capable of transmitting the respective telemetry data, and in such case analytics system 102 may be configured to retrieve the respective telemetry data from such networked-connected devices, e.g., on a periodic basis.

Telemetry data 114a-114m may include information such as, for example, operational log of the device, status of the device at a given time, and one or more parameters sensed or measured by the device if the device is equipped with one or more sensors, etc. Telemetry data 114a-114m from network-connected devices 112a-112m are received by analytics system 102 as device telemetry data stream 116 to be processed by the one or more servers 104 of analytics system 102. Network-connected devices 112a-112m may or may not be manufactured by the same manufacturer.

Social media portals 122a-122n may include a set of websites, virtual communities and/or networks in which people share and/or exchange information and ideas. For the purpose of the present disclosure, users of social media portals 122a-122n share and/or exchange sentiments toward the devices that they own, owned, use and/or used. For example, one or more users of social media portals 122a-122n may post a message indicating how satisfied or dissatisfied he/she is about a given product (e.g., one of the devices 112a-112m), his/her experience in using the given product, and/or feelings or thoughts he/she has or had about the given product. Such information is referred to as user sentiment information about one or more of the devices 112a-112m. Feeds of user sentiment information 124a-124n from social media portals 122a-122n are received by analytics system 102 as user sentiment information stream 126 to be processed by the one or more servers 104 of analytics system 102. Feeds of user sentiment information 124a-124n may be retrievable or otherwise receivable by analytics system 102 over one or more wired and/or wireless networks (not shown) by any suitable communication protocols and technologies. For example, analytics system 102 may be capable of retrieving the feeds of user sentiment information 124a-124n from social media portals 122a-122n, e.g., on a periodic basis.

Figure 2:
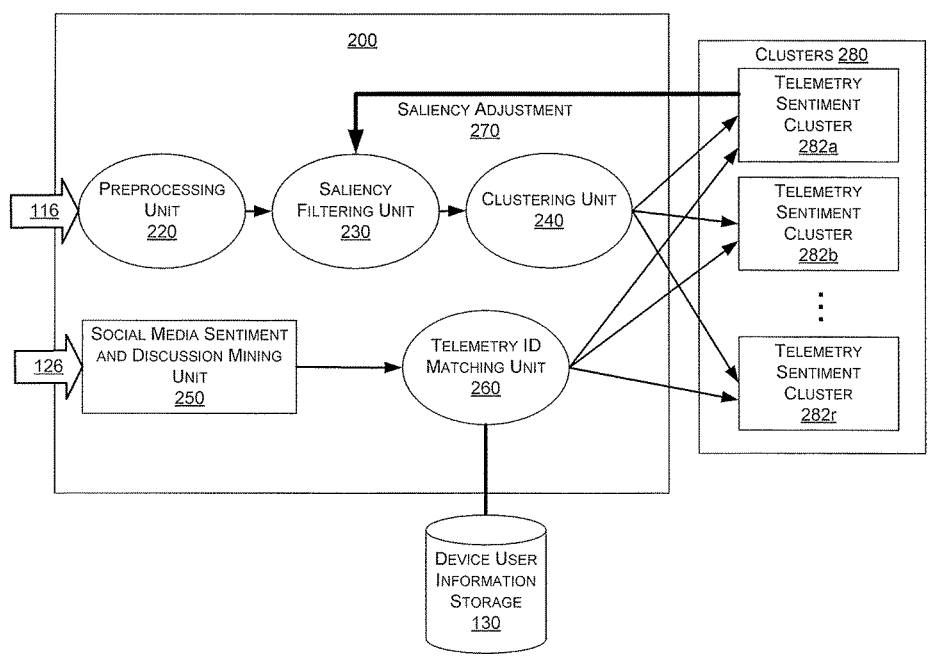
FIG. 2 shows an example scheme in which device telemetry for user experience predictions may be implemented, arranged in accordance with at least some of the embodiments described herein.

FIG. 2 shows an example scheme in which device telemetry for user experience predictions may be implemented, arranged in accordance with at least some of the embodiments described herein. As depicted, telemetry and sentiment monitoring module 200 may include preprocessing unit 220, saliency filtering unit 230, clustering unit 240, social media sentiment and discussion mining unit 250, and telemetry ID matching unit 260.

Preprocessing unit 220 may be configured to preprocess one or more streams of telemetry data, e.g., device telemetry data stream 116, from a plurality of devices, e.g., network-connected devices 112a-112m, to provide preprocessed telemetry data by scaling the received telemetry data.

Saliency filtering unit 230 may be configured to perform dimensionality reduction in the preprocessed telemetry data. Social media sentiment and discussion mining unit 250 may be configured to perform data mining on one or more streams of user sentiment information, e.g., user sentiment information stream 126, to identify or otherwise obtain information on user sentiments toward one or more devices, e.g., network-connected devices 112a-112m. Telemetry ID matching unit 260 may be configured to perform operations including: matching at least a portion of the user sentiments, from social media sentiment and discussion mining unit 250, to one or more of user IDs of a first set of users of the plurality of the devices, e.g., from device user information storage 130; correlating the matched one or more of the user IDs to one or more of the devices associated with at least one of the one or more streams of telemetry data; and receiving information from social media indicative of user sentiments toward the devices.

Clustering unit 240 may be configured to cluster a second set of users of the devices, e.g., users of a larger set of devices including network-connected devices 112a-112m, into multiple clusters 280 of users each of which associated with a respective user sentiment toward the devices, where the second set of users is greater than the first set of users in terms of quantity of users. For example, clusters 280 may include telemetry sentiment clusters 282a-282r.

In some embodiments, in performing dimensionality reduction, saliency filtering unit 230 may be configured to perform the dimensionality reduction using singular value decomposition.

In some embodiments, each of telemetry sentiment clusters 282a-282r of clusters 280 may include users experiencing similar operating regime or subject to similar use patterns of the devices.

In some embodiments, saliency filtering unit 230 may be configured to adjust, based at least in part on the clustering, the dimensionality reduction to preserve dimensional data in the preprocessed telemetry data relevant to sentiment.

In some embodiment, telemetry and sentiment monitoring module 200 may be further configured to perform one or more pre-emptive and/or corrective actions. For example, telemetry and sentiment monitoring module 200 may be configured to send an offer for an add-on product to at least one of the users having a positive sentiment toward the devices. Additionally or alternatively, telemetry and sentiment monitoring module 200 may be configured to send corrective information, a suggestion, or an upgrade to at least one of the users predicted to have a negative user experience related to the devices.

In general, device telemetry data stream 116 received by preprocessing unit 220, which performs real-time data analytics to output a new stream, e.g., scores or values that are used for later processing. The preprocessed data is sent to saliency filtering unit 230, which performs dimensional reduction (e.g., principal component analysis) informed specifically by saliency adjustments 270 based on clusters 280. Data from saliency filtering unit 230 is subject to clustering by clustering unit 240 (e.g., K-means clustering) to produce telemetry sentiment clusters 282a-282r, each of which indicating an item ID of a given type of devices that is experiencing similar operating regime or use patterns (e.g., users of the given type of devices shares similar experience related to the device). Social media sentiment and discussion mining unit 250 receives user sentiment information stream 124n from social media portals 122a-122n to provide mined data to telemetry ID matching unit 260. Telemetry ID matching unit 260 matches, correlates or otherwise associates some sampling of telemetry data with social media and online discussions of one or more of network-connected devices 112a-112m (e.g., via names or emails of registered owners) to label the sentiments associated with data points within clusters 280. Clusters 280 thus include combinations of telemetry data and user sentiments. Telemetry and sentiment monitoring module 200 may perform sentiment tagging of telemetry sentiment clusters 282a-282r of clusters 280 to provide saliency adjustment 270 to saliency filtering unit 230 to preserve dimensional data relevant to sentiments for clustering unit 240. The final product of telemetry and sentiment monitoring module 200 is the clusters 280 that provide groupings of devices in the field, clustered by operation and usage, and with indicators of customer sentiment when the device operates in that regime.

Specific example implementations of some of the components of telemetry and sentiment monitoring module 200 are described below. Those skilled in the art would appreciate that the scope of the present disclosure is not limited to the examples described herein.

With respect to the implementation of preprocessing unit 220, many elements used in the objective function of learning algorithms (such as the RBF kernel of Support Vector Machines or the L1 and L2 regularizers of linear models) are theoretically developed assuming that features are centered around 0 and have variance in the same order. If a feature has a variance that is orders of magnitude larger than others, it might dominate the objective function and make the estimator unable to learn from other features correctly as expected. Thus, preprocessing of data is commonly used to standardize incoming values, for example, by recasting all incoming multivalued features as Gaussian with 0 mean and unit variance. To support this, many data processing libraries include tools that allow the scaling of data or conversion of descriptive labels (such as location or model type) to such data.

The Python library sklearn (scikit-learn) allows one to perform typical scale preprocessing in a few lines of code. First, the data is collected into registered lines (where the features above each other in a matrix view are the same feature for different records). This may be done with the sample code shown below or may be broken up into multiple stream bolts by having a bolt that emits different feature types to different scaling bolts in the context of Storm real-time analytics.

```
training_features=np.reshape(features,(len(sample_labels),-1))
from sklearn.preprocessing import scale
scaled_features=scale(training_features) # goes through each column of features and centers around zero with unit norm.
```

Note that the sample code merely provides scaling among current data. Scikit-learn also provides a scaling object class which, after being applied to a first tranche of data, may be applied to later tranches of data to maintain consistent scaling conversion.

With respect to saliency filtering unit 230, in some embodiments, linear dimensionality reduction such as Singular Value Decomposition (SVD) of the data is used to keep the most significant singular vectors to project the data to a lower dimensional space. In linear algebra, SVD is a factorization of a real or complex matrix that breaks most arbitrary matrices into real or complex unitary matrices and a rectangular diagonal matrix. The preprocessing performed by preprocessing unit 220 is important when SVD is used in saliency filtering unit 230. In some embodiments, the form of SVD used for dimensional reduction is principal component analysis (PCA). PCA is used to decompose a multivariate dataset into a set of successive orthogonal components that explain a maximum amount of the variance.

If simple PCA is used it may be implemented from library as follows (where here an artificially simple conversion to 2 dimensions may be performed so that later an X-Y plot may be shown):

```
from sklearn.decomposition import PCA
reduced_data=PCA(n_components=2).fit_transform(scaled_features).
```

This, however, is simplified in many ways and consideration of the complexities will illustrate the meaning and application of saliency filtering unit 230 and the feedback of saliency feedback adjustment 270. The PCA implicitly includes an SVD "fit" of the data and this implies an understanding of which aspects of the data are important (and thus for which information should be preserved). The PCA fit (available in Python sci-kit learn via the fit estimator labels) may be evaluated for homogeneity, completeness, mutual information preservation, and more. Saliency adjustment 270 may carry this information as a function of the later sentiment labeling, back to saliency filtering unit 230 to ensure that the dimensionality that is reduced does not eliminate any of the differentiation in expected customer sentiment. For example, a particular variable such as display current draw may seem, without sentiment data, to not matter to reliability and may be eliminated by uninformed PCA of the device telemetry data. The display current draw, however, may turn out to be a point of classification separation for sentiment (e.g., brighter displays mean happier customers up until it uses so much current it lowers battery life). This data may be lost from the telemetry data without saliency filtering unit 230 that receives saliency adjustment 270 from sentiment tagged clusters 280. By optimizing mutual information and other metrics as a function of sentiment cluster discrimination (which is not in the telemetry data), the dimensional reduction may be done without losing important sentiment indicators that are not inherently evident from the telemetry data.

Preferably, dimensional reduction is done before clustering unit 240 for scalability, with sentiment tagging at the operating cluster level to allow for imputing missing data since sentiment may not be available from all users. This leads to the architecture shown with saliency filtering unit 230 informed by saliency adjustment 270.

In a specific example, saliency filtering unit 230 may be realized with a truncated SVD decomposition that keeps the k largest singular values and k may be varied to optimize the amount of separation found after clustering among the different sentiments assigned to the same clustering. This feedback results in final clusters that combine separation of operating or usage regimes and sentiment.

With respect to clustering unit 240, clustering algorithms are algorithms that take data, generally unlabeled, and attempt to cluster the data based on similarity or nearness in a feature space. In the present disclosure, for example, clustering by telemetry features results in collections of self-labeled points that represent similar operating and use regimes. For example, heavy-use cases may be separate from light-use cases, and within those cases a proper clustering may separate by product variations such as variable device power use, heat, or status labels. Clustering unit 240 may employ a suitable clustering algorithm from among a number of clustering algorithms such as, for example, K-means, Affinity Propagation, Spectral clustering, and the like.

The large sample size and medium desired count of clusters suggests K-means is a desirable clustering algorithm for clustering unit 240. In some embodiments, K-Means algorithm may be utilized by clustering unit 240 to cluster data by trying to separate samples in n groups of equal variance, minimizing a criterion known as the 'inertia' of the groups of samples. Ultimately this finds the boundaries that result in groups with minimum Euclidean-like distances between the centroid and points.

Python has a K-means routine built in and has been shown for streaming clustering using a pipeline based on co-routines. In some embodiments, clustering unit 240 may use the sample code below:

```
from sklearn.cluster import KMeans
kmeans=KMeans(init='k-means++', k=12, n_init=10, whiten=True)
kmeans.fit(reduced_data).
```

The result may be shown on a 2-D diagram because the data was earlier PCA reduced to two dimensions, although real data processing may retain far more dimensions. In some embodiments, each cluster region may represent a particular operating regime or usage style based on device telemetry data. As an example, assuming a particular device is a washing machine, the telemetry regions may reflect levels of loading, temperature of incoming water, output from water vorticity sensors (e.g., used to track water dirtiness as clothes clean), amounts of detergent, and so on. Adding the sentiment data in accordance with the present disclosure may find a region reflecting users who have poor hot water supply, overload the washer, and have high soiling left in the clothes toward the end of the cycle and, thus, are unhappy. Another region may indicate users who load the washer optimally and where vorticity sensors show the clothes are getting very clean and, thus, the users may be happy. The present disclosure allows automated separation, classification, and user sentiment assessment so that the manufacturers who utilize the information may apply different strategies for customer relationship management with these user groups.

Devices may move among the clusters as they are used on different days or for different purposes/events, but the records with time information of the devices may still be illuminating, especially if they match up to social media postings. Techniques for mining such paths among multiple states are still emerging in data science and such data may allow multiple engagement strategies or nuanced strategies to emphasize the positive aspects over the negative aspects for users.

Telemetry ID matching unit 260 is used to match at least some portion of the output of social media sentiment and discussion mining unit 250 to specific known users and, thus, to specific device telemetry data streams (e.g., a portion of device telemetry data stream 116) and ultimately to specific device data points in the clusters 280. For example, telemetry ID matching may be achieved by providing telemetry and sentiment monitoring module 200 with lists of customer device serial numbers and the emails from associated user registration forms. The registration information may additionally include social media identities, e.g., obtained through promotional offerings that reward a user "following" or "liking" a manufacturer. Many data processors or marketing firms may also sell information on the relationship between social media accounts or email accounts. A seller of an IoT-enabled appliance or device may thus have many chances to connect a user to his/her social media account and, thus, to associate specific device unique identifiers to social media. In some embodiments, telemetry ID matching unit 260 may take social media sentiment outputs identified as relating to the particular product by a social media source, link it to the appropriate device serial number or unique identifier, and then label the data point of that unique device in the clusters 280 with the associated sentiment.

It is not necessary to have a large number of sentiment data points in each telemetry sentiment cluster 282a-282r of clusters 280. If a million copies of a particular product were sold and the clustering resolves to 20 natural use cases, for example, that would be an average of 50,000 devices feeding telemetry data to each use case while only a few dozen sentiment data points are needed to get a good statistical indication of the sentiment and certainty of sentiment for a given cluster. That means a social media detection and matching ratio of 0.00048 (48 hundred thousandths) would be all that is needed to accrue sufficient data, whereas more than half of all consumers report that they are social media users. Considering that sentiment information may be collected over significant time-spans and that a single social-media using owner may post about different use cases on different days (thereby providing multiple data point labels via telemetry ID matching unit 260), the social media tagging should be sufficiently available.

Figure 3:
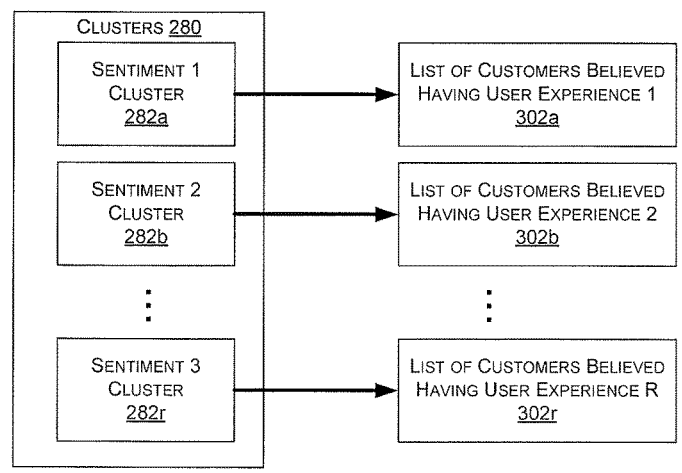
FIG. 3 shows an example scheme in which customer categorization may be implemented, arranged in accordance with at least some of the embodiments described herein.

FIG. 3 shows an example scheme in which customer categorization may be implemented, arranged in accordance with at least some of the embodiments described herein.

The payoff for the manufacturer of implementing the sentiment informed monitoring system comes once the telemetry sentiment clusters 282a-282r become associated with user sentiments. Telemetry sentiment clusters 282a-282r then become reflections of different customer use cases and how they feel about the product in those use cases. Some of the telemetry sentiment clusters 282a-282r may become known for happy customers, allowing a list to be generated for users who are probably both happy with the product and partaking of a certain use case—and those customers may be cross-marketed with products that fit the specific use case knowing that they already like the product. The list may reflect all users despite the fact that perhaps a small number may have posted about the product because they have been grouped by the telemetry data of their devices—this being the payoff for the technique of the present disclosure.

Another list may reflect users who are seeing a particular use case for which the product is not performing well and the manufacturer may offer those customers accessories to improve the match of the device to the use case (e.g., a shoe shelf for the dryer if the user is trying to dry shoes a lot). If the use case is associated with failures or problems a list may be generated from the telemetry sentiment clusters 282a-282r to allow the manufacturer to proactively reach out to those customers, e.g., with support calls, mailers, or emails suggesting better ways to use the device. In the previous example of a washing machine not receiving enough hot water and being overloaded and thus not cleaning well, the users may receive targeted communications letting them know about proper load levels or the importance of good hot water to defray mislaid blame such as: "Did you know washing machines perform best when loaded just to the load line?" or "Washing machines without hot enough input water can take 2-3× as long to clean the same clothes." These emails or mailers may seem like random product newsletters to the users but thanks to the combination of sentiment and telemetry sentiment clustering, the manufacturer may be well aware of which users need what message.

Each of telemetry sentiment clusters 282a-282r represents a grouping of devices/users with particular use cases and negative or positive outcomes. In some embodiments, telemetry and sentiment monitoring module 200 may be configured to generate, based at least in part on the clustering, a first list of users from the plurality of second set of users having a positive sentiment toward the devices (e.g., list 302a of customers believed having user experience 1), a second list of users from the plurality of second set of users with a potential problem with the devices (e.g., list 302b of customers believed having user experience 2), and a third list of users from the plurality of second set of users with a particular user case with respect to the devices (e.g., list 302r of customer believed having user experience R).

Referring to FIG. 3, telemetry sentiment clusters 282a-282r may be exported to categorized customer lists 302a-302r. Categorized customer lists 302a-302r may include, for example, a list of customers believed having user experience 1 (e.g., happy) 302a, a list of customers believed having user experience 2 (e.g., with potential or actual problems) 302b, and other lists reflecting various device usage cases up to list 302r. These exports may be regular events or in response to database queries. The exports need not be in batch form. For example, analytics system 102 may be set up to generate a stream listing users that change states. This allows a manufacturer to send an informative email to a user as soon as their device strays into a potential negative user experience-generating operating or use case. For example, a user may try to use his/her microwave in a new way and, as a result, receive an email shortly thereafter with tips on how best to use the microwave in various situations. This may happen without the manufacturer having to predict operating regimes or consumer behavior or write software to try to recognize behavior on the device.

The determinations presented herein may be achieved at a population level. Analytics system 102 may recognize that certain types of use cases and operations are most likely to result in what sentiment but there may be exceptions. Individuals may have more nuanced reactions. For example, one user might be using his/her washing machine to dye fabrics and so may be completely happy despite his/her washing machine reporting what appears to be high dirt and soil levels throughout an agitation cycle. Tracking and evaluating individuals, however, requires some form of high-frequency feedback at the level of each user. The present disclosure is large scale and is designed to provide an automated data mining and analytics capability to a manufacturer participating in the Internet of Things.

In summary, the proposed scheme of the present disclosure couples analytics of device telemetry and social media analysis in a clustering and grouping system that provides powerful new customer relationship tools for the Internet of Things. The tools and resulting data are useful for relationship building or marketing to specific target user groups, helping to reduce customer problems and head off customer dissatisfaction, and even for understanding the use cases of products to help in strategic choices around follow-on products. The proposed scheme may be stand-alone with minimal need for domain expertise, allowing it to be provided as a service to any manufacturer or product company with a product connected to the Internet of Things.

Figure 4:
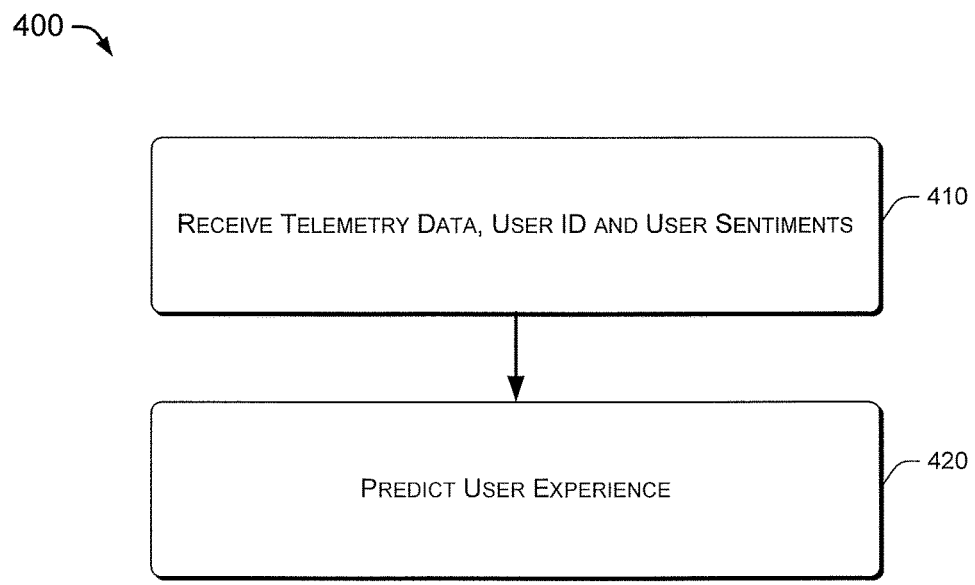
FIG. 4 shows an example processing flow with which device telemetry for user experience predictions may be implemented, arranged in accordance with at least some of the embodiments described herein.

FIG. 4 shows an example processing flow 400 with which device telemetry for user experience predictions may be implemented, arranged in accordance with at least some of the embodiments described herein. Processing flow 400 may be implemented by one or more processors of the one or more servers 104 of analytics service 102 of FIG. 1, telemetry and sentiment monitoring module 200 of FIG. 2, or computing device of FIG. 6. Further, processing flow 400 may include one or more operations, actions, or functions depicted by one or more blocks 410 and 420. Although illustrated as discrete blocks, various blocks may be divided into additional blocks, combined into fewer blocks, or eliminated, depending on the desired implementation. Processing flow 400 may begin at block 410.

Block 410 (Receive Telemetry Data, User ID and User Sentiments) may refer to one or more processors receiving telemetry data from a plurality of devices, user IDs of a first set of users of the plurality of the devices, and information from social media indicative of user sentiments toward the devices. For example, referring to FIG. 1, one or more processors of one or more servers 104 may receive device telemetry data stream 116 from network-connected devices 112*a*-112*m*, user sentiment information stream 126 from social media portals 122*a*-122*n*, and user IDs from device user information storage 130. Block 410 may be followed by block 420.

Block 420 (Predict User Experience) may refer to the one or more processors predicting user experience related to the devices based at least in part on the telemetry data, the user IDs, and the information from the social media. For example, the one or more processors of one or more servers 104 may predict user experience related to network-connected devices 112*a*-112*m* based on the data/information received.

In some embodiments, in receiving the data/information, the one or more processors may preprocess one or more streams of telemetry data from the plurality of devices to provide preprocessed telemetry data by scaling the received telemetry data. For example, the one or more processors of one or more servers 104 may preprocess device telemetry data stream 116 from devices 112*a*-112*m* to provide preprocessed telemetry data by scaling the received telemetry data 114*a*-114*m*.

In some embodiments, processing flow 400 may also include performing dimensionality reduction in the preprocessed telemetry data. In performing dimensionality reduction, processing flow 400 may perform the dimensionality reduction using singular value decomposition. The singular value decomposition may be done by principal component analysis (PCA). For example, the one or more processors of one or more servers 104 may perform dimensionality reduction by using singular value decomposition such as PCA.

Additionally, processing flow 400 may include: matching at least a portion of the user sentiments to one or more of the user IDs; and correlating the matched one or more of the user IDs to one or more of the devices associated with at least one of the one or more streams of telemetry data. For example, the one or more processors of one or more servers 104 may match at least a portion of the user sentiments to one or more of the users IDs, and correlate the matched one or more of the user IDs to one or more of devices 112*a*-112*m* associated with at least one of the telemetry data 114*a*-114*m*.

Additionally, processing flow 400 may further include clustering a second set of users of the devices into a plurality of clusters of users, each of which is associated with a respective user sentiment toward the devices, and the second set is greater than the first set. In some embodiments, each of the clusters may include users sharing similar experiences related to the devices. For example, the one or more processors of one or more servers 104 may cluster users of devices into clusters 280 including telemetry sentiment clusters 282*a*-282*r*.

Additionally, processing flow 400 may further include adjusting, based at least in part on the clustering, the dimensionality reduction to preserve dimensional data in the preprocessed telemetry data relevant to sentiment. For example, the one or more processors of one or more servers 104 may adjust the dimensionality reduction to preserve dimensional data in the preprocessed telemetry data relevant to sentiment.

In some alternative embodiments, processing flow 400 may further include generating, based at least in part on the clustering, a first list of users from the plurality of second set of users having a positive sentiment toward the devices, a second list of users from the plurality of second set of users with a potential problem with the devices, and a third list of users from the plurality of second set of users with a particular user case with respect to the devices. For example, the one or more processors of one or more servers 104 may categorize the telemetry sentiment clusters 282*a*-282*r* into lists 302*a*-302*r* of customers believed having various user experiences.

In some embodiments, processing flow 400 may include performing an operation in response to the predicting. The operation may include at least one of the following: providing an offer for an add-on product to at least one of the users having a positive sentiment toward the devices; or providing corrective information, a suggestion, or an upgrade to at least one of the users predicted to have a negative user experience related to the devices. For example, the one or more processors of one or more servers 104 may sent emails to users to provide an offer for an add-on product to at least one of the users having a positive sentiment toward the devices or to provide corrective information, a suggestion, or an upgrade to at least one of the users predicted to have a negative user experience related to the devices.

Figure 5:
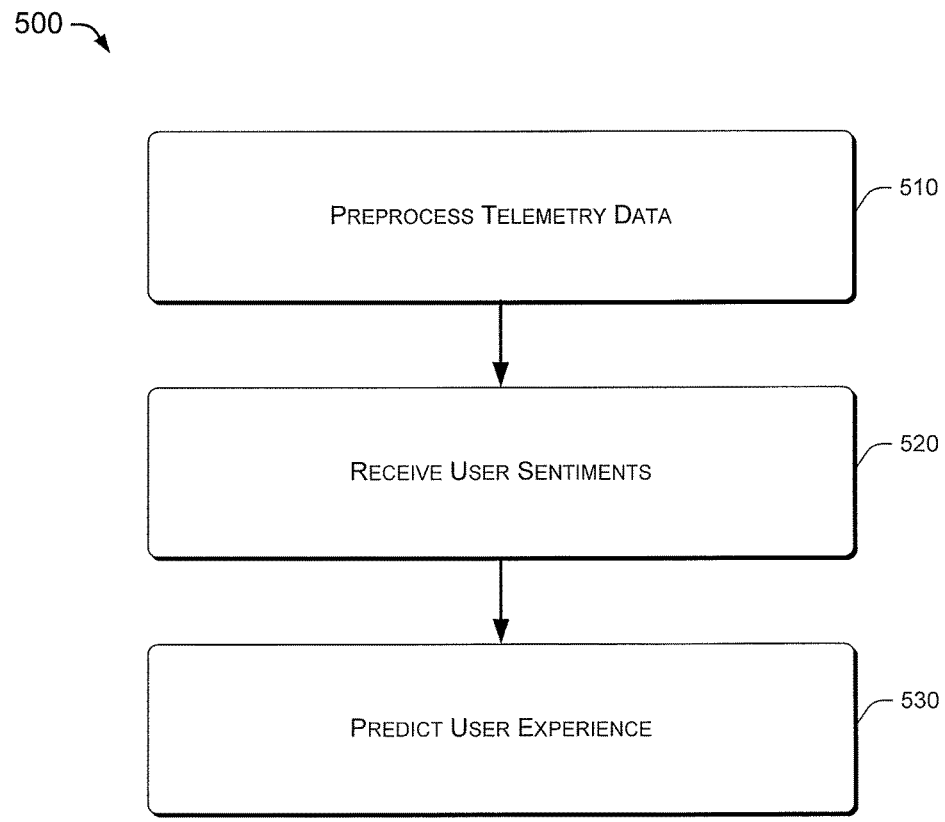
FIG. 5 shows another example processing flow with which device telemetry for user experience predictions may be implemented, arranged in accordance with at least some of the embodiments described herein.

FIG. 5 shows another example processing flow 500 with which device telemetry for user experience predictions may be implemented, arranged in accordance with at least some of the embodiments described herein. Processing flow 500 may be implemented by one or more processors of the one or more servers 104 of analytics service 102 of FIG. 1, telemetry and sentiment monitoring module 200 of FIG. 2, or computing device of FIG. 6. Further, processing flow 500 may include one or more operations, actions, or functions depicted by one or more blocks 510, 520 and 530. Although illustrated as discrete blocks, various blocks may be divided into additional blocks, combined into fewer blocks, or eliminated, depending on the desired implementation. Processing flow 500 may begin at block 510.

Block 510 (Preprocess Telemetry Data) may refer to one or more processors preprocessing one or more streams of telemetry data from a plurality of devices to provide preprocessed telemetry data by scaling the received telemetry data. For example, preprocessing unit 220 of telemetry and sentiment monitoring module 200 may preprocess one or more streams of telemetry data 112*a*-112*m* from devices 112*a*-112*m* to provide preprocessed telemetry data by scaling the received telemetry data. Block 510 may be followed by block 520.

Block 520 (Receive User Sentiments) may refer to the one or more processors receiving information from social media indicative of user sentiments toward the devices. For example, social media sentiment and discussion mining unit 250 of telemetry and sentiment monitoring module 200 may receive user sentiment information stream 126 indicative of user sentiments toward the devices 112*a*-112*m*. Block 520 may be followed by block 530.

Block 530 (Predict User Experience) may refer to the one or more processors predicting a user experience related to the devices based at least in part on the telemetry data, the user IDs, and the information from the social media. For example, telemetry and sentiment monitoring module 200 may predict user experience related to devices 112*a*-112*m*, e.g., by generating clusters 280 having telemetry sentiment clusters 282*a*-282*r*, based at least in part on the data/information received.

In some embodiments, processing flow 500 may also include performing dimensionality reduction in the preprocessed telemetry data. In performing dimensionality reduction, processing flow 400 may include performing the dimensionality reduction using singular value decomposition. The singular value decomposition may be done by PCA. For example, the one or more processors of one or more servers 104 may perform dimensionality reduction by using singular value decomposition such as PCA.

In some embodiments, processing flow 500 may also include: matching at least a portion of the user sentiments to one or more of user IDs of a first set of users of the plurality of the devices; and correlating the matched one or more of the user IDs to one or more of the devices associated with at least one of the one or more streams of telemetry data. For example, the one or more processors of one or more servers 104 may match at least a portion of the user sentiments to one or more of the users IDs, and correlate the matched one or more of the user IDs to one or more of devices 112*a*-112*m* associated with at least one of the telemetry data 114*a*-114*m*.

Additionally, processing flow 500 may further include clustering a second set of users of the devices into a plurality of clusters of users, each of which is associated with a respective user sentiment toward the devices, and the second set is greater than the first set. In some embodiment, each of the clusters may include users sharing similar experiences related to the devices. For example, the one or more processors of one or more servers 104 may cluster users of devices into clusters 280 including telemetry sentiment clusters 282*a*-282*r*.

Additionally, processing flow 500 may further include adjusting, based at least in part on the clustering, the dimensionality reduction to preserve dimensional data in the preprocessed telemetry data relevant to sentiment. For example, the one or more processors of one or more servers 104 may adjust the dimensionality reduction to preserve dimensional data in the preprocessed telemetry data relevant to sentiment.

Additionally, processing flow 500 may further include generating, based at least in part on the clustering, a first list of users from the plurality of second set of users having a positive sentiment toward the devices, a second list of users from the plurality of second set of users with a potential problem with the devices, and a third list of users from the plurality of second set of users with a particular user case with respect to the devices. For example, the one or more processors of one or more servers 104 may categorize the telemetry sentiment clusters 282*a*-282*r* into lists 302*a*-302*r* of customers believed having various user experiences.

In some embodiments, processing flow 500 may, in response to the predicting, performing at least one of the following: sending an offer for an add-on product to at least one of the users having a positive sentiment toward the devices; or sending corrective information, a suggestion, or an upgrade to at least one of the users predicted to have a negative user experience related to the devices. For example, the one or more processors of one or more servers 104 may sent emails to users to provide an offer for an add-on product to at least one of the users having a positive sentiment toward the devices or to provide corrective information, a suggestion, or an upgrade to at least one of the users predicted to have a negative user experience related to the devices.

Figure 6:
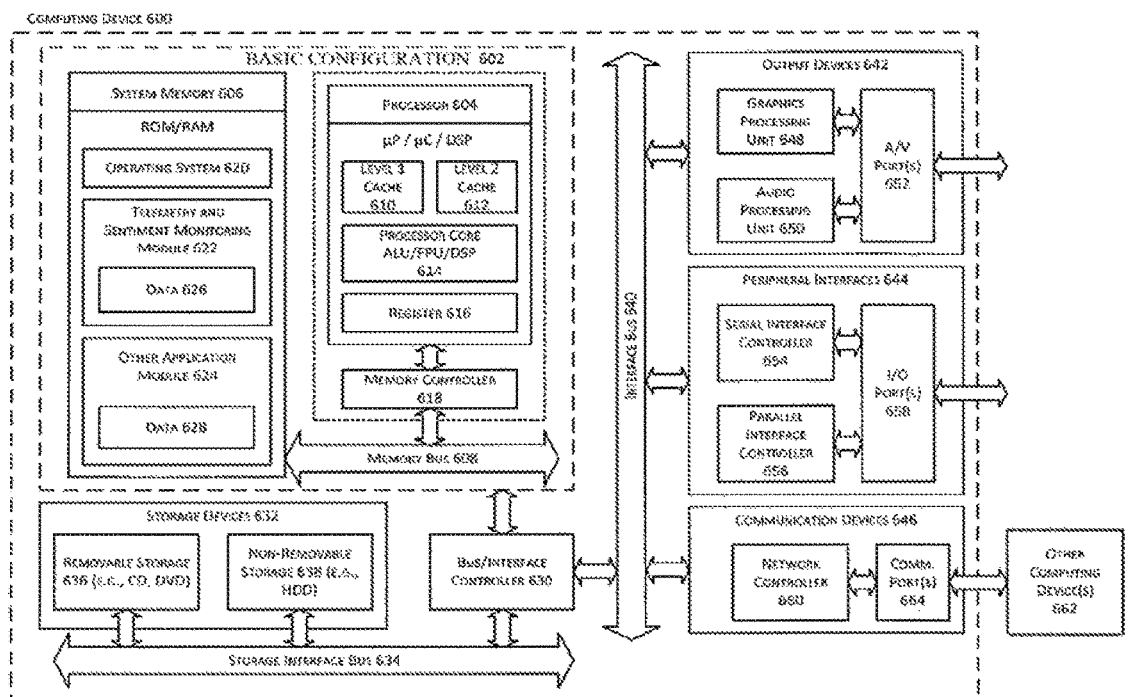
FIG. 6 shows a block diagram illustrating an example computing device by which various example solutions described herein may be implemented, arranged in accordance with at least some of the embodiments described herein.

FIG. 6 shows a block diagram illustrating an example computing device 600 by which various example solutions described herein may be implemented, arranged in accordance with at least some embodiments described herein.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, telemetry and sentiment monitoring module 622 and other application module 624. Telemetry and sentiment monitoring module 622 may be similar to telemetry and sentiment monitoring module 200 of FIG. 2, and perform functions as described herein with respect to FIG. 1 and FIG. 2. Other application module 624 may perform functions related or unrelated to functions described herein with respect to FIG. 1 and FIG. 2. Telemetry and sentiment monitoring module 622 includes data 626, which may be useful for operation of telemetry and sentiment monitoring module 622. Similarly, other application module 624 includes data 628, which may be useful for operation of other application module 624. In some embodiments, telemetry and sentiment monitoring module 622 may be arranged to operate in conjunction with or on operating system 620, such that implementations of telemetry and sentiment monitoring with respect to multiple telemetry data streams, e.g., processing flow 400 of FIG. 4 and processing flow 500 of FIG. 5, may be provided as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. Computing device 600 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device configuration 300 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
receiving, by one or more processors, telemetry data from a plurality of devices, user identifications (IDs) of a first set of users of the plurality of devices, and information from social media indicative of user sentiments toward the plurality of devices;
predicting, by the one or more processors, the user sentiments toward the plurality of devices based at least in part on the telemetry data, the user IDs, and the information from the social media, wherein the user sentiments comprise at least one of a positive sentiment toward the plurality of devices, a potential problem with the plurality of devices, or a particular user case with respect to the plurality of devices; and
in response to the prediction, performing an operation comprising:
providing an offer for an add-on product to at least one user of the first set of users having the positive sentiment toward the plurality of devices, and
providing at least one of a corrective information, a suggestion, or an upgrade to at least one user of the first set of users predicted to have the potential problem with the plurality of devices.

2. The method of claim 1, wherein the receiving comprises preprocessing one or more streams of the telemetry data from the plurality of devices to provide preprocessed telemetry data by scaling the received telemetry data.

3. The method of claim 2, further comprising:
performing dimensionality reduction in the preprocessed telemetry data.

4. The method of claim 3, wherein the performing the dimensionality reduction comprises performing the dimensionality reduction using singular value decomposition.

5. The method of claim 4, wherein the singular value decomposition comprises principal component analysis.

6. The method of claim 3, further comprising:
matching at least a portion of the user sentiments to one or more of the user IDs; and
associating the matched one or more of the user IDs to one or more of the plurality of devices associated with at least one of the one or more streams of the telemetry data.

7. The method of claim 6, further comprising:
clustering a second set of users of the plurality of devices into a plurality of clusters of users, wherein each of the plurality of clusters of users is associated with a respective user sentiment toward the plurality of devices, and wherein the second set of users is greater than the first set of users.

8. The method of claim 7, wherein each of the plurality of clusters of users includes users sharing similar experiences related to the plurality of devices.

9. The method of claim 7, further comprising:
adjusting, based at least, in part, on the clustering, the dimensionality reduction to preserve dimensional data in the preprocessed telemetry data relevant to the user sentiments.

10. The method of claim 7, further comprising:
generating, based at least, in part, on the clustering, a first list of users from the second set of users having the positive sentiment toward the plurality of devices, a second list of users from the second set of users with the potential problem with the plurality of devices, and a third list of users from the second set of users with the particular user case with respect to the plurality of devices.

11. A non-transitory computer-readable medium that stores executable instructions that, in response to execution, cause one or more processors to perform or control performance of operations to:
preprocess one or more streams of telemetry data from a plurality of devices to provide preprocessed telemetry data by scaling the telemetry data;
obtain user identifications (IDs) of users of the plurality of devices and information from social media indicative of user sentiments toward the plurality of devices;
predict the user sentiments toward the plurality of devices based at least, in part, on the telemetry data, the user IDs, and the information from the social media, wherein the user sentiments comprise at least one of a positive sentiment toward the plurality of devices, a potential problem with the plurality of devices, or a particular user case with respect to the plurality of devices; and
in response to the prediction, perform or control the performance of at least one of the operations to:
send an offer for an add-on product to at least one user of the first set of users having the positive sentiment toward the plurality of devices, and
send at least one of corrective information, a suggestion, or an upgrade to at least one user of the first set of users predicted to have the potential problem with the plurality of devices.

12. The non-transitory computer-readable medium of claim 11, wherein the executable instructions comprise instructions that, in response to execution, cause the one or more processors to perform or control performance of at least one of the operations to:
perform dimensionality reduction in the preprocessed telemetry data.

13. The non-transitory computer-readable medium of claim 12, wherein to perform the dimensionality reduction, the executable instructions further comprise instructions that cause the one or more processors to perform or control performance of the at least one of the operations to perform the dimensionality reduction by use of singular value decomposition.

14. The non-transitory computer-readable medium of claim 13, wherein the singular value decomposition comprises principal component analysis.

15. The non-transitory computer-readable medium of claim 12, wherein the executable instructions comprise instructions that, in response to execution, cause the one or more processors to perform or control performance of at least one of the operations to:
match at least a portion of the user sentiments to one or more of the user IDs; and
correlate the matched one or more of the user IDs to one or more of the plurality of devices associated with at least one of the one or more streams of the telemetry data.

16. The non-transitory computer-readable medium of claim 15, wherein the executable instructions comprise instructions that, in response to execution, cause the one or more processors to perform or control performance of at least one of the operations to:
cluster a second set of users of the plurality of devices into a plurality of clusters of users, wherein each of the plurality of clusters of users is associated with a respective user sentiment toward the plurality of devices, and wherein the second set of users is greater than the first set of users.

17. The non-transitory computer-readable medium of claim 16, wherein each of the plurality of clusters of users includes users sharing similar experiences related to the plurality of devices.

18. The non-transitory computer-readable medium of claim 16, wherein the executable instructions comprise instructions that, in response to execution, cause the one or more processors to perform or control performance of at least one of the operations to:
adjust, based at least, in part, on the clustered second set of users, the dimensionality reduction to preserve dimensional data in the preprocessed telemetry data relevant to the user sentiments.

19. The non-transitory computer-readable medium of claim 16, wherein the executable instructions comprise instructions that, in response to execution, cause the one or more processors to perform or control performance of at least one of the operations to:
generate, based at least, in part, on the clustered second set of users, a first list of users from the second set of users having the positive sentiment toward the plurality of devices, a second list of users from the second set of users with the potential problem with the plurality of devices, and a third list of users from the second set of users with the particular user case with respect to the plurality of devices.

20. An apparatus, comprising:
a telemetry and sentiment monitoring module, comprising:
a preprocessing unit configured to preprocess one or more streams of telemetry data from a plurality of devices to provide preprocessed telemetry data by scaling the telemetry data;
a saliency filtering unit configured to perform dimensionality reduction in the preprocessed telemetry data;
a telemetry identification (ID) matching unit configured to perform operations to:
match at least a portion of the user sentiments to one or more of user IDs of a first set of users of the plurality of devices,
correlate the matched one or more of the user IDs to one or more of the plurality of devices associated with at least one of the one or more streams of the telemetry data, and
receive information from social media indicative of user sentiments toward the plurality of devices; and
a clustering unit configured to cluster a second set of users of the plurality of devices into a plurality of clusters of users, wherein each of the plurality of clusters of users is associated with a respective user sentiment toward the plurality of devices, wherein the second set of the users is greater than the first set of the users, and wherein the user sentiments comprise at least one of a positive sentiment toward the plurality of devices, a potential problem with the plurality of devices, or a particular user case with respect to the plurality of devices, and
wherein the telemetry and sentiment monitoring module is further configured to perform operations to:
send an offer for an add-on product to at least one user of the first set of users having the positive sentiment toward the plurality of devices; and
send at least one of a corrective information, a suggestion, or an upgrade to at least one user of the first set of users predicted to have a negative user experience related to the plurality of devices.

21. The apparatus of claim 20, wherein the saliency filtering unit is configured to perform the dimensionality reduction by use of singular value decomposition.

22. The apparatus of claim 20, wherein each of the plurality of clusters of users includes users experiencing similar operating regime or subject to similar use patterns of the devices.

23. The apparatus of claim 20, wherein the saliency filtering unit is further configured to adjust, based at least, in part, on the clustered second set of users, the dimensionality reduction to preserve dimensional data in the preprocessed telemetry data relevant to the user sentiments.

24. The apparatus of claim 20, wherein the telemetry and sentiment monitoring module is configured to generate, based at least, in part, on the clustered second set of users, a first list of users from the second set of users having the positive sentiment toward the plurality of devices, a second list of users from the second set of users with the potential problem with the plurality of devices, and a third list of users from the second set of users with the particular user case with respect to the plurality of devices.

* * * * *